United States Patent
Saito et al.

(10) Patent No.: US 7,217,209 B2
(45) Date of Patent: May 15, 2007

(54) BELT TYPE CONTINUOUSLY VARIABLE TRANSMISSION

(75) Inventors: Toshihiro Saito, Saitama (JP); Takemasa Okano, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 139 days.

(21) Appl. No.: 10/394,580

(22) Filed: Mar. 24, 2003

(65) Prior Publication Data

US 2003/0232674 A1   Dec. 18, 2003

(30) Foreign Application Priority Data

Mar. 28, 2002  (JP)  ............... 2002-092475

(51) Int. Cl.
*F16G 5/20* (2006.01)
*F16H 55/56* (2006.01)

(52) U.S. Cl. ........................ 474/242; 474/201; 474/8

(58) Field of Classification Search .................. 474/8, 474/201, 242, 245
See application file for complete search history.

(56) References Cited

U.S. PATENT DOCUMENTS

| 4,080,841 | A | | 3/1978 | Vollers | |
|---|---|---|---|---|---|
| 4,596,536 | A | | 6/1986 | Okawa et al. | |
| 4,820,242 | A | | 4/1989 | Sato | |
| 4,898,567 | A | * | 2/1990 | Tatara et al. | 474/201 |
| 5,964,818 | A | * | 10/1999 | Kanehara et al. | 474/8 |
| 6,406,395 | B1 | * | 6/2002 | Wakui et al. | 474/242 |
| 6,409,620 | B1 | * | 6/2002 | Yoshida et al. | 474/242 |
| 6,440,024 | B1 | * | 8/2002 | Kobayashi | 474/242 |
| 6,565,469 | B1 | * | 5/2003 | Aoyama et al. | 474/242 |
| 6,749,530 | B2 | * | 6/2004 | Okano et al. | 474/28 |
| 6,824,484 | B2 | * | 11/2004 | Greiter | 474/201 |
| 6,832,967 | B2 | * | 12/2004 | Kanokogi et al. | 474/242 |
| 2002/0142870 | A1 | | 10/2002 | Okano et al. | |

FOREIGN PATENT DOCUMENTS

| EP | 1 288 530 A1 | 3/2003 |
|---|---|---|
| JP | 52-47158 | 4/1977 |
| JP | 6-73513 | 10/1994 |
| JP | 2001-304362 | 10/2001 |
| JP | 2002-174309 | 6/2002 |
| WO | WO (01/92763 A1 * | 12/2001 |

* cited by examiner

*Primary Examiner*—Marcus Charles
(74) *Attorney, Agent, or Firm*—Arent Fox PLLC

(57) ABSTRACT

A belt type continuously variable transmission includes a drive pulley having a fixed pulley half and a movable pulley half; a driven pulley having a fixed pulley half and a movable pulley half; and a metal belt. The metal belt includes a metal ring assembly having a plurality of endless metal rings laminated on one another and a plurality of metal elements supported on the metal ring assembly. The metal belt is wound around the drive pulley and the driven pulley. The movable pulley half of the drive pulley has a flexural stiffness higher than that of the fixed pulley half of the drive pulley, wherein it is difficult for the edges of the metal ring assembly to contact the metal elements and a V-face of the drive pulley.

12 Claims, 17 Drawing Sheets

3D FEM Pulley deformation 3D rigid pulley with flexural stiffness

Rotational spring

Km  Ks 3D rigid pulley with flexural stiffness

Stiffness K

3D FEM Pulley deformation

Flexible pulley

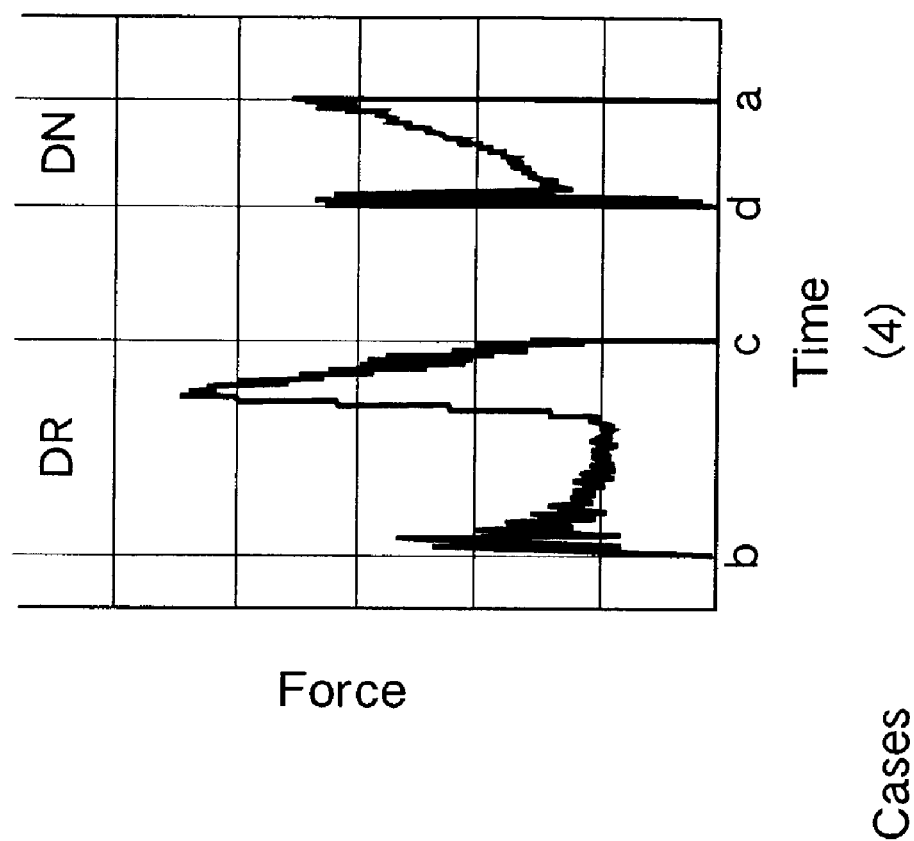
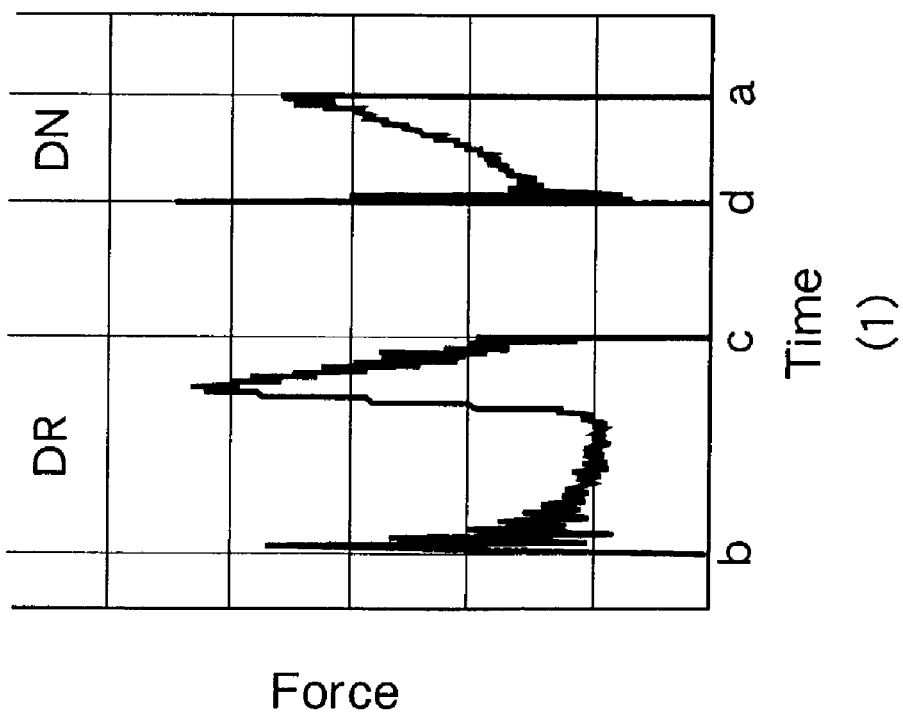

BELT TYPE CONTINUOUSLY VARIABLE TRANSMISSION

BACKGROUND OF THE INVENTION

1. Field of the Invention

The present invention relates to a belt type continuously variable transmission in which a metal belt is wound around a drive pulley and a driven pulley.

2. Description of Related Art

In recent years, under circumstances of increasing demand for environmentally friendly automobiles, a belt type continuously variable transmission that uses a metal belt has attracted attention as a transmission that is capable of reducing fuel consumption while simultaneously improving running performance. The belt type continuously variable transmission provides a relatively smooth acceleration without shift-shock, is relatively quiet in terms of running performance, and achieves lower fuel consumption compared to an automatic transmission by integral control of the transmission and an engine that maintains engine rotational speed with relatively high combustion efficiency in terms of fuel consumption. There is an increasing need for additional increased torque transmission capacity of the belt type continuously variable transmission to enhance multi-purpose features that enable application to various types of vehicles.

Conventionally, as disclosed in Japanese Patent Application Laid-open No. 52-47158, the saddle faces of the metal elements are made into a convex shape (i.e., crowning) to center the metal ring assembly on the saddle faces in order to prevent deterioration of durability from the edges of the metal ring assembly moving on the saddle faces of the metal elements contacting the neck parts of the metal elements and V-faces of pulleys.

However, even if the saddle faces of the metal elements are configured to have a convex shape so as to perform the centering function, the metal ring assembly inevitably moves on the saddle faces under certain operating conditions of the belt type continuously variable transmission. As one of the causes, it has been found that the movement of the metal ring assembly is greatly influenced by the ratio of the flexural stiffness of the movable pulley half compared to that of the fixed pulley half of the drive pulley.

SUMMARY OF THE INVENTION

It is an object of the present invention to overcome the above-described deficiencies of the related art.

It is also an object of the present invention to improve the durability of a metal ring assembly of a belt type continuously variable transmission by making it difficult for the edges of the metal ring assembly to contact the metal elements and V-faces of the drive and driven pulleys.

In order to achieve the above objects, in accordance with the present invention, there is provided a belt type continuously variable transmission that includes a drive pulley having a fixed pulley half and a movable pulley half; a driven pulley having a fixed pulley half and a movable pulley half; and a metal belt. The metal belt includes a metal ring assembly having a plurality of endless metal rings laminated onto one another; and a plurality of metal elements supported on the metal ring assembly. The metal belt is wound around the drive and driven pulleys. The movable pulley half of the drive pulley has a flexural stiffness higher than a flexural stiffness of the fixed pulley half of the drive pulley.

In the above-described structural arrangement, the flexural stiffness of the movable pulley half of the drive pulley is set to be higher than the flexural stiffness of the fixed pulley half of the drive pulley. Therefore, it is difficult for the edges of the metal ring assembly to contact the metal elements and V-faces of the pulleys, thereby improving the durability of the metal ring assembly.

A mode for carrying out the present invention is explained below by reference to an embodiment of the present invention shown in the attached drawings.

BRIEF DESCRIPTION OF THE DRAWINGS

FIGS. 15A and 15B are graphs illustrating the distribution of load in the peripheral direction of the metal ring assemblies in cases (1) and (4);

DETAILED DESCRIPTION OF PREFERRED EMBODIMENT

Figure 2:
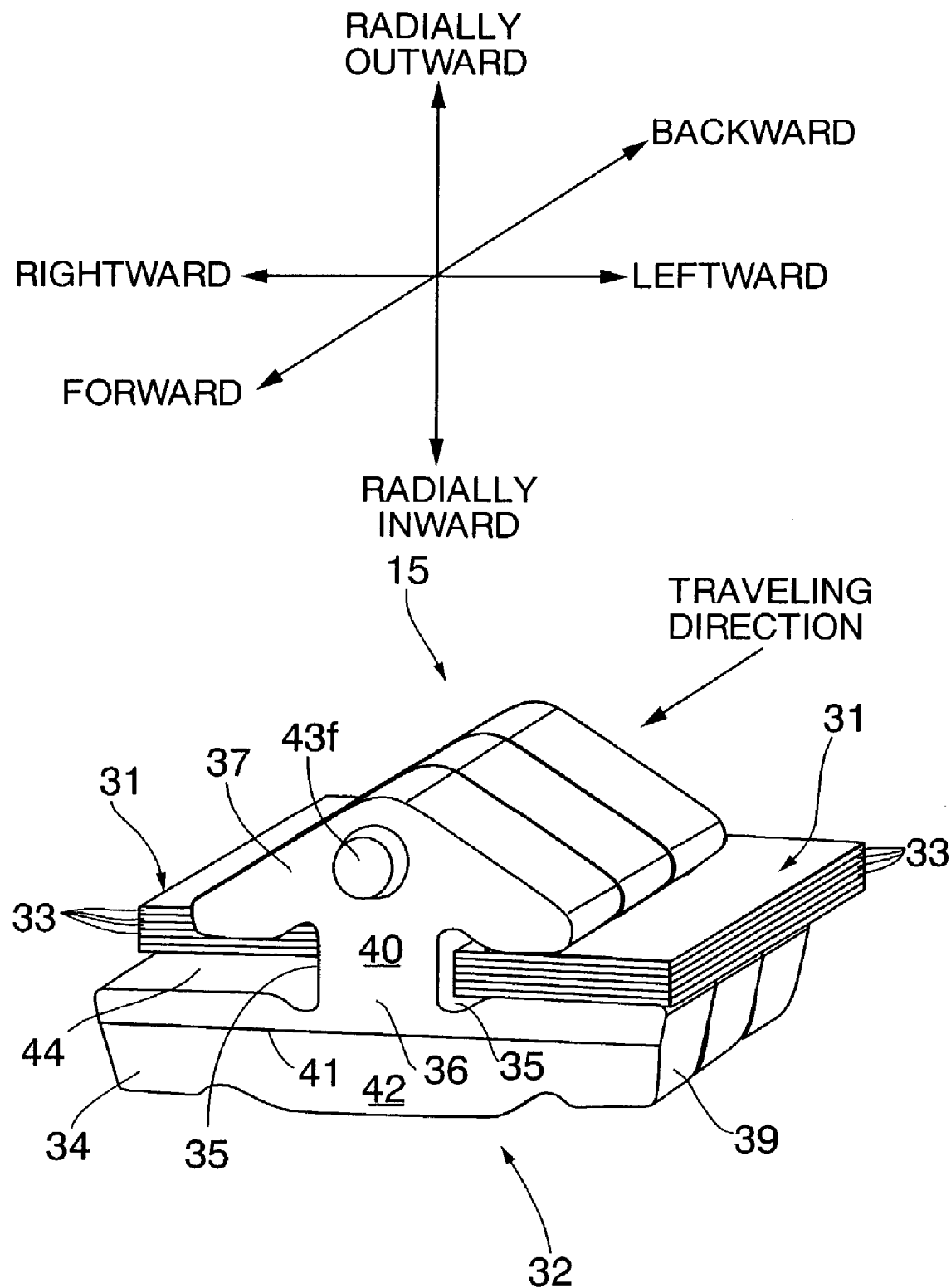
FIG. 2 is a partial perspective view of a metal belt.

For purposes of explaining the present invention, the forward and backward directions, the left and right directions, and the radial direction of the metal elements used in the present invention are defined as shown in FIG. 2. The radial direction is defined as the radial direction of a pulley with which the metal element is in contact. The side closer to the rotational axis of the pulley is the radially inner side and the side further from the rotational axis of the pulley is the radially outer side. The left and right directions of the metal element are defined as the directions along the rotational axis of the pulley with which the metal element is in contact. The forward and backward directions are defined as the directions along the traveling direction of the metal element when the vehicle travels forward.

Figure 1:
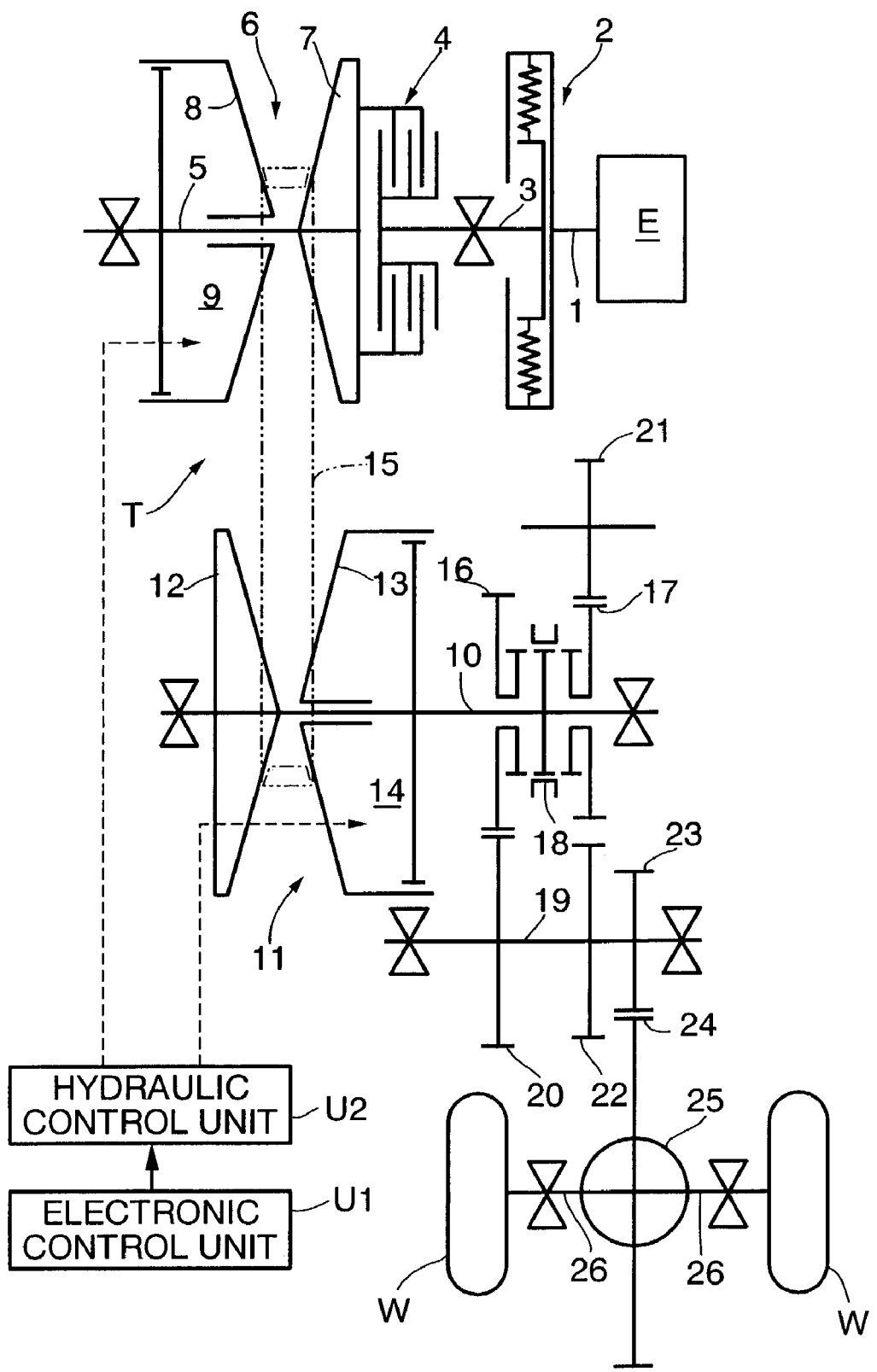
FIG. 1 is a schematic diagram of a power transmission system of a vehicle equipped with a metal belt type continuously variable transmission according to the present invention.

FIG. 1 shows the schematic structure of a metal belt type continuously variable transmission T installed in an automobile. An input shaft 3 is connected to a crankshaft 1 of an engine E via a damper 2. The input shaft is also connected to a drive shaft 5 of the metal belt type continuously variable transmission T via a starting clutch 4. A drive pulley 6 provided on the drive shaft 5 includes a fixed pulley half 7 secured to the drive shaft 5 and a movable pulley half 8 that can move toward and away from the fixed pulley half 7. The movable pulley half 8 is biased toward the fixed pulley half 7 by a hydraulic pressure acting on an oil chamber 9.

A driven pulley 11 is provided on a driven shaft 10 disposed in parallel to the drive shaft 5, and includes a fixed pulley half 12 secured to the driven shaft 10 and a movable pulley half 13 movable toward and away from the fixed pulley half 12. The movable pulley half 13 is biased toward the fixed pulley half 12 by a hydraulic pressure acting on an oil chamber 14. Wound around the drive pulley 6 and the driven pulley 11 is a metal belt 15 that includes a pair of left and right metal ring assemblies 31 and a large number of metal elements 32 supported on the metal ring assemblies 31 (see FIG. 2). Each of the metal ring assemblies 31 is formed by laminating twelve metal rings 33 on one another.

Relatively rotatably supported on the driven shaft 10 are a forward drive gear 16 and a reverse drive gear 17 which can be selectively connected to the driven shaft 10 via a selector 18. Secured to an output shaft 19 disposed in parallel to the driven shaft 10 are a forward driven gear 20 and a reverse driven gear 22. The forward driven gear 20 meshes with the forward drive gear 16. The reverse driven gear 22 meshes with the drive gear 17 via a reverse idle gear 21.

Rotation of the output shaft 19 is input via a final drive gear 23 and a final driven gear 24 into a differential 25 and transmitted therefrom to driven wheels W via left and right axles 26.

The driving force of the engine E is transmitted to the driven shaft 10 via the crankshaft 1, damper 2, input shaft 3, starting clutch 4, drive shaft 5, drive pulley 6, metal belt 15, and driven pulley 11. When a forward range is selected, the driving force of the driven shaft 10 is transmitted to the output shaft 19 via the forward drive gear 16 and the forward driven gear 20, thereby driving the vehicle forward. When a reverse range is selected, the driving force of the driven shaft 10 is transmitted to the output shaft 19 via the reverse drive gear 17, reverse idle gear 21, and reverse driven gear 22, thereby driving the vehicle in reverse.

At this time, the gear ratio of the metal belt type continuously variable transmission T is continuously or steplessly adjustable by controlling the hydraulic pressures acting on the oil chamber 9 of the drive pulley 6 and the oil chamber 14 of the driven pulley 11 by a hydraulic pressure control unit U2 operated by commands from an electronic control unit U1. That is, increasing the hydraulic pressure acting on the oil chamber 14 of the driven pulley 11 relative to the hydraulic pressure acting on the oil chamber 9 of the drive pulley 6 decreases the channel width of the driven pulley 11 so as to increase the effective radius thereof while simultaneously increasing the channel width of the drive pulley 6 so as to decrease the effective radius thereof. As a result, the gear ratio of the metal belt type continuously variable transmission T therefore continuously varies toward LOW. On the other hand, increasing the hydraulic pressure acting on the oil chamber 9 of the drive pulley 6 relative to the hydraulic pressure acting on the oil chamber 14 of the driven pulley 11 decreases the channel width of the drive pulley 6 so as to increase the effective radius thereof while simultaneously increasing the channel width of the driven pulley 11 so as to decrease the effective radius thereof. As a result, the gear ratio of the metal belt type continuously variable transmission T continuously varies toward OD.

Figure 3:
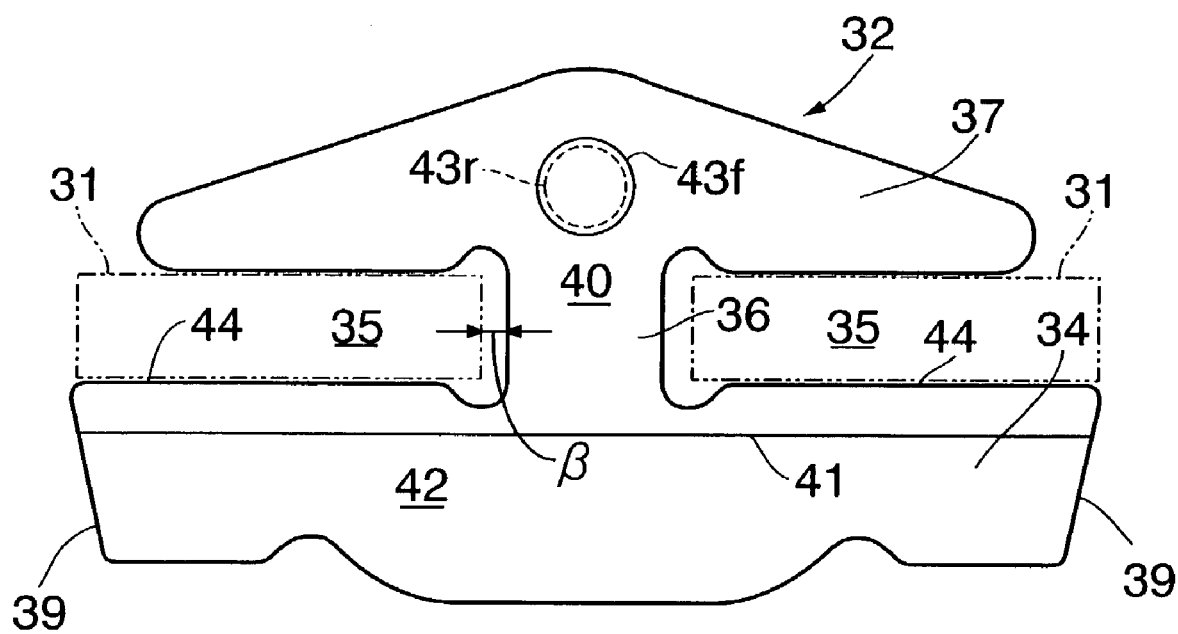
FIG. 3 is a front view of a metal element.

As shown in FIGS. 2 and 3, the metal element 32 formed by punching out a metal sheet includes a substantially trapezoidal element main body 34, a neck portion 36 positioned between a pair of left and right ring slots 35 into which the metal ring assemblies 31 are fitted, and a substantially triangular ear portion 37 connected to an upper part of the element main body 34 via the neck portion 36. Formed on opposite ends in the left and right direction of the element main body 34 are a pair of pulley abutment surfaces 39 that can abut V-faces of the drive pulley 6 and driven pulley 11. Main surfaces 40 are formed on the forward side and rear side in the traveling direction of the metal elements 32. The main surfaces 40 abut the main surfaces 40 of adjacent metal elements 32. An inclined surface 42 is formed in a lower part of the main surface 40 on the forward side in the traveling direction via a rocking edge 41 extending in the left and right direction. Furthermore, in order to join metal elements 32 that are adjacent to each other in the traveling direction, projections 43$f$ and recesses 43$r$ are formed on the front and rear surfaces of the ear portions 37 so that the projection 43$f$ and the recess 43$r$ mate with each other. Formed on lower edges of the left and right ring slots 35 are saddle faces 44 to support the inner peripheral surfaces of the metal ring assemblies 31.

Figure 4:
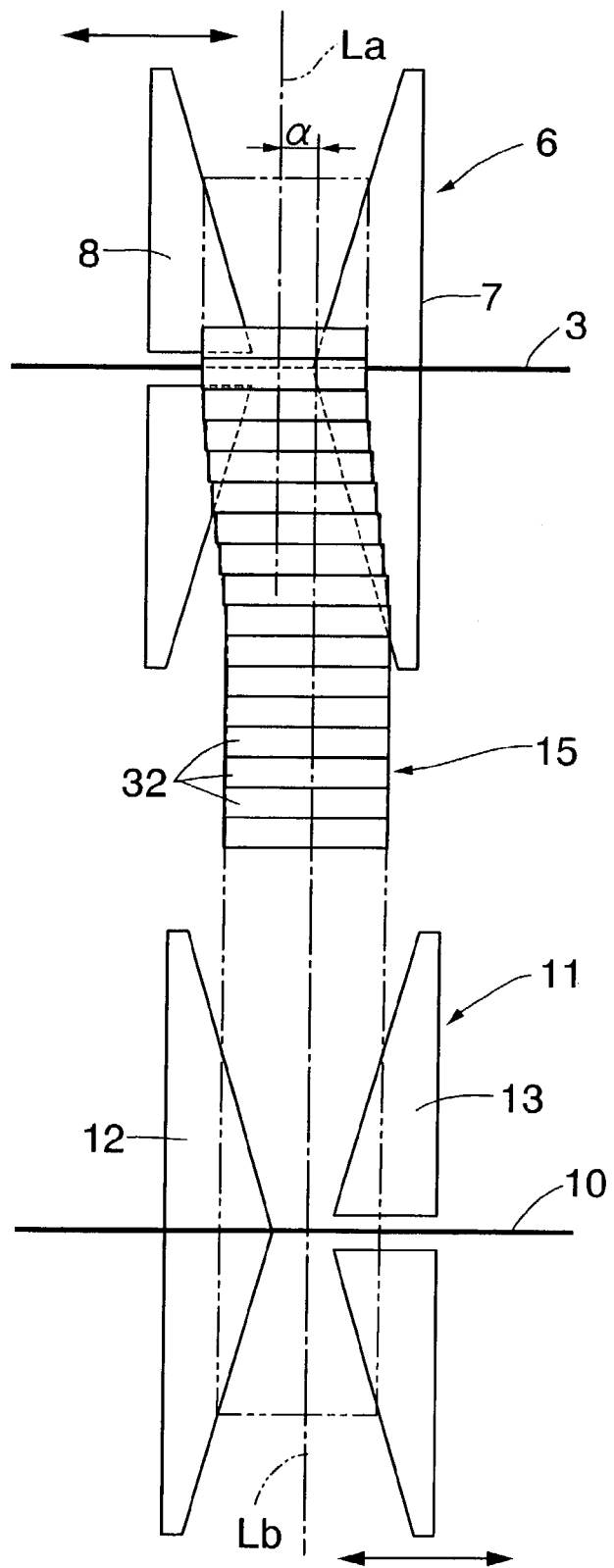
FIG. 4 is a schematic diagram used to explain the definition of misalignment.

As shown in FIG. 4, in the metal belt type continuously variable transmission T formed by winding the metal belt 15 around the drive pulley 6 and the driven pulley 11, the fixed pulley half 7 of the drive pulley 6 and the fixed pulley half 12 of the driven pulley 11 are disposed in diagonal positions, and the movable pulley half 8 of the drive pulley 6 and the movable pulley half 13 of the driven pulley 11 are disposed in diagonal positions. Therefore, when the movable pulley halves 8, 13 of the drive pulley 6 and the driven pulley 11 move toward or away from the fixed pulley halves 7, 12, a central line La of the V-shaped channel of the drive pulley 6 and a central line Lb of the V-shaped channel of the driven pulley 11 do not coincide with each other, thus causing a slight misalignment α.

Figure 5:
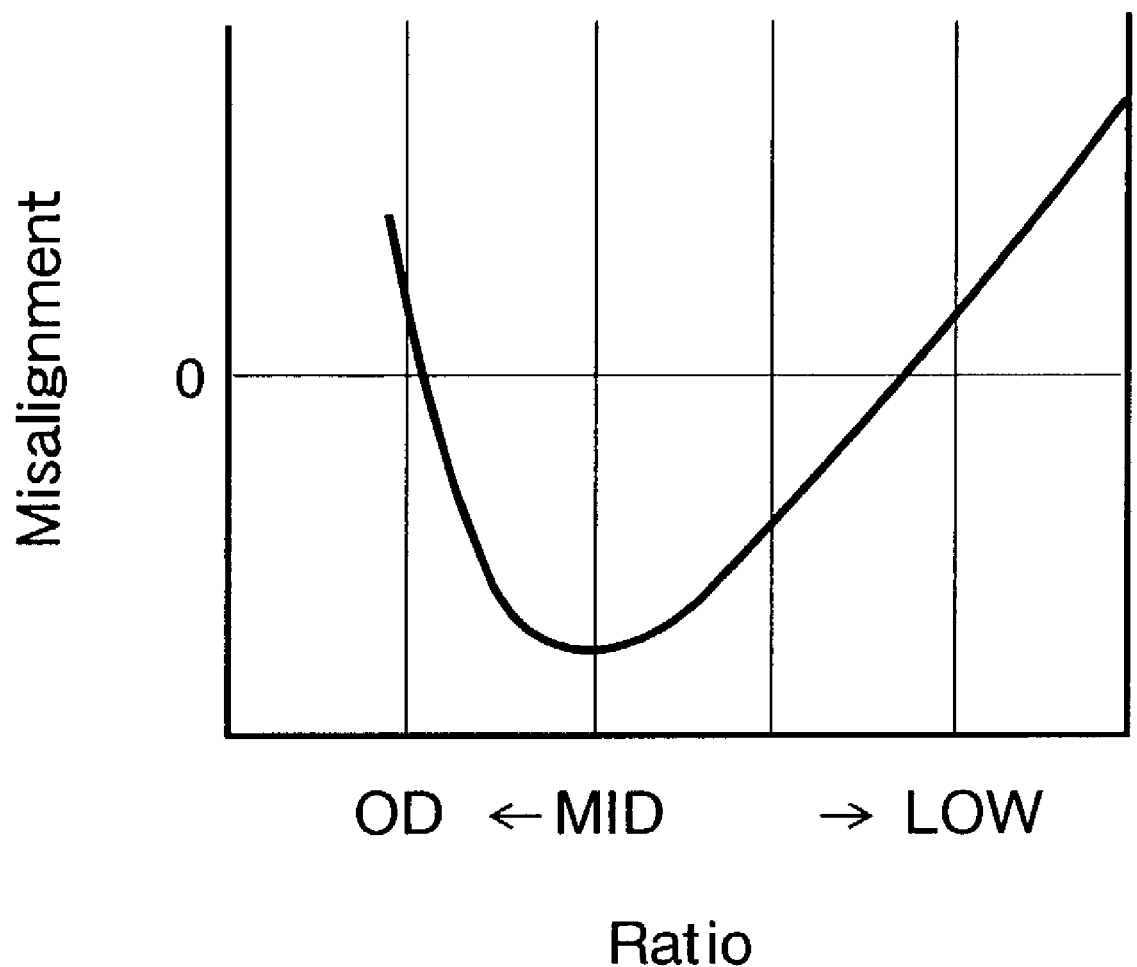
FIG. 5 is a graph illustrating the relationship between the ratio of the metal belt type continuously variable transmission and misalignment.

It is known from experiments that when the misalignment becomes large, the lifetime of the metal belt 15 is shortened. The misalignment does not become zero even if the pulleys are assumed to be rigid, and the level of misalignment is determined by the ratio of the metal belt type continuously variable transmission T (see FIG. 5). Furthermore, since the actual pulleys have a finite stiffness value, it is important to take into consideration the influence of deformation of the pulleys on the misalignment. However, in the current situation, it cannot be said that the relationship between the strength of the metal belt 15 and the misalignment during operation of the metal belt type continuously variable transmission T has been well clarified. In view of the difficulty in measuring the misalignment during operation of the metal belt type continuously variable transmission T, the behavior of the metal belt 15 during operation of the metal belt type continuously variable transmission T has been analyzed by a simulation. Because the purpose thereof was to understand the influence of the flexural stiffness of the pulleys, the analysis was carried out using a simple model in which the number of metal elements 32 was 280 and the number of metal rings 33 of the metal ring assembly 31 was three.

Figure 6:
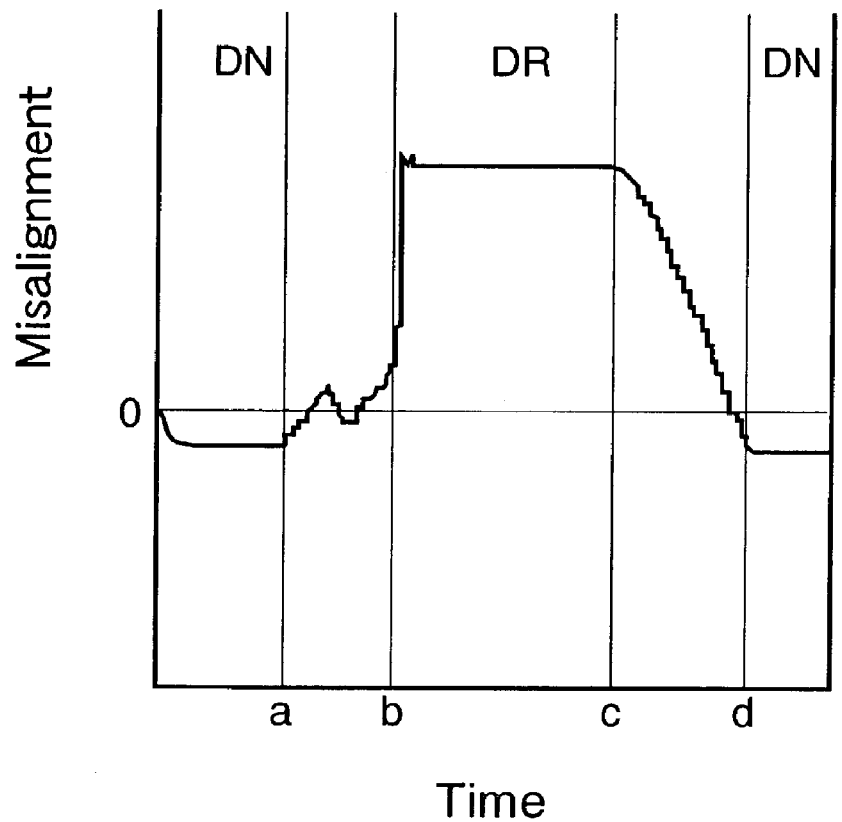
FIG. 6 is a graph illustrating the distribution of misalignment in the peripheral direction of a metal ring assembly when pulleys are assumed to be rigid.
Figure 7:
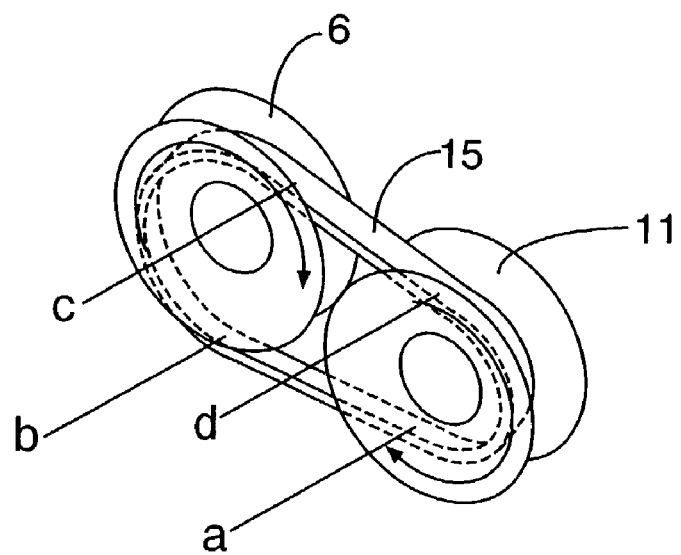
FIG. 7 is a schematic diagram used to explain the definition of each position in the peripheral direction of the metal belt.

First, the analysis was carried out for a case in which both the drive pulley 6 and the driven pulley 11 were assumed to be rigid and the influence of flexing thereof was not considered. FIG. 6 shows the relationship between the misalignment (ordinate) of the metal elements 32. The peripheral positions (abscissa) of the metal belt 15; a, b, c, and d on the abscissa, as shown in FIG. 7, correspond to the exit portion of the driven pulley 11, the entrance portion of the drive pulley 6, the exit portion of drive pulley 6, and the entrance portion of the driven pulley 11, respectively. The misalignment of the metal elements 32 is maintained at a constant value in the section between b and c where the metal belt 15 is wound around the drive pulley 6 and in the section between d and a where the metal belt 15 is wound around the driven pulley 11. The misalignment of the metal elements 32 rapidly increases in the part b where the metal belt 15 starts to become wound around the drive pulley 6. The misalignment is measured relative to the center line Lb of the V-shaped channel between the fixed pulley half 12 and the movable pulley half 13 of the driven pulley 11 (see FIG. 4).

Figure 8:
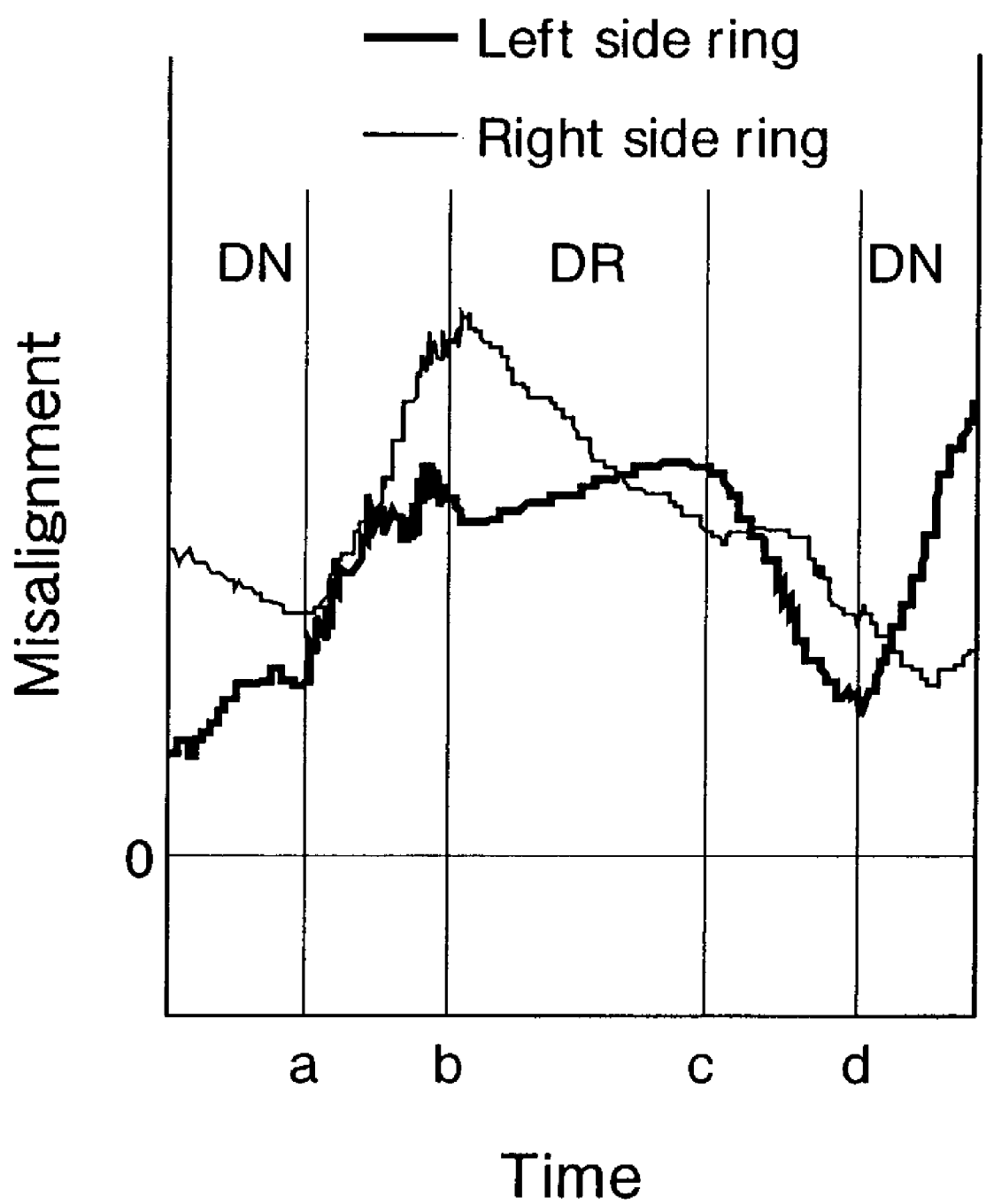
FIG. 8 is a graph illustrating the distribution of misalignment in the peripheral direction of left and right metal ring assemblies.
Figure 9:
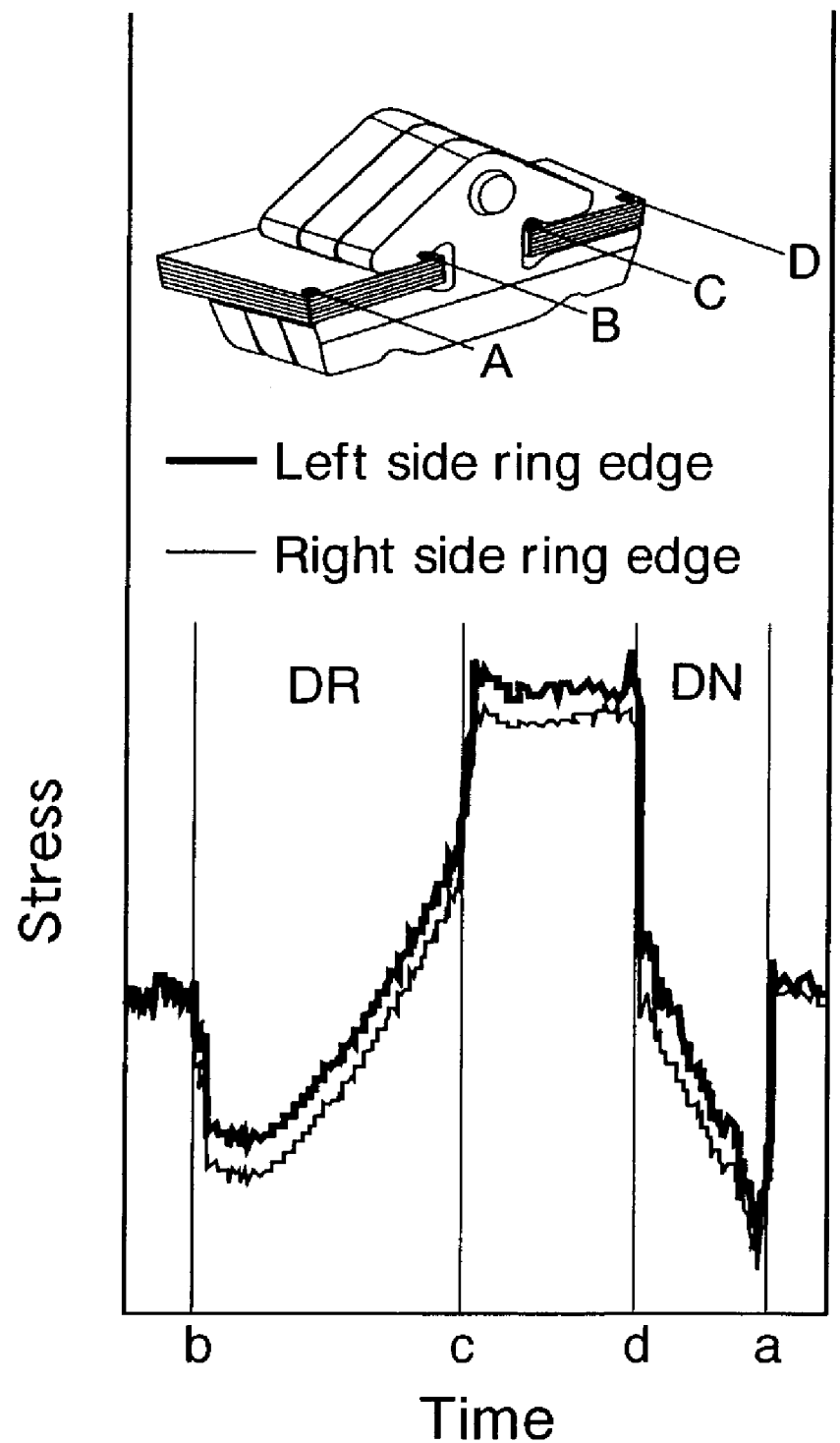
FIG. 9 is a diagram showing the distribution of stress in the peripheral direction of the outer edges of the left and right metal ring assemblies.

As shown in FIG. 8, unlike the misalignment of the metal elements 32, the misalignment of the left and right metal ring assemblies 31 changes smoothly in the peripheral direction while the metal ring assemblies 31 have a difference in speed relative to the saddle faces 44 of the metal elements 32. FIG. 9 shows the stress on the outer edges of the left and right metal ring assemblies 31 (position A and position D). It is clear that the left and right metal ring assemblies 31 are in different states of stress due to the influence of the misalignment of the metal elements 32, and the stress is higher at the outer edges of the left and right metal ring assemblies 31.

Figure 10B:
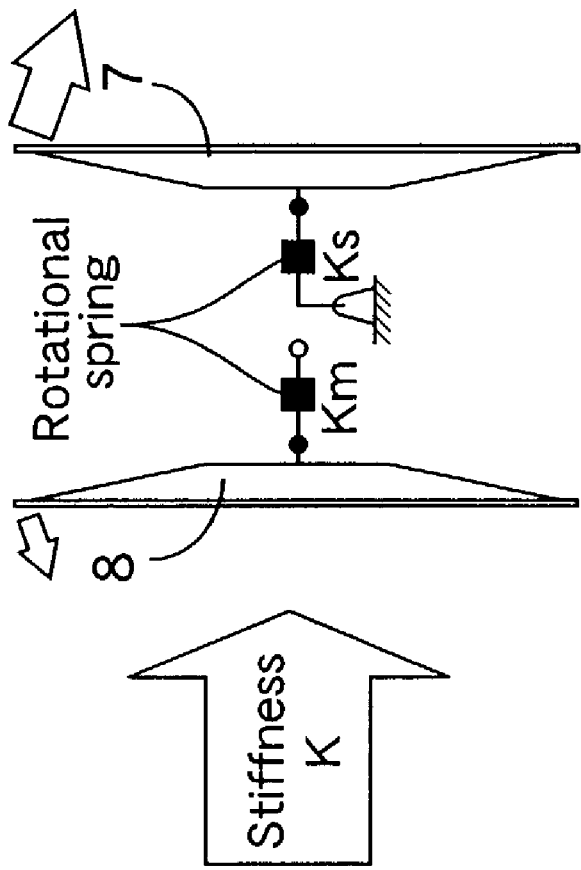
FIGS. 10A and 10B are schematic diagrams used to explain a model in which the flexural stiffness of the pulleys is taken into consideration.
Figure 10A:
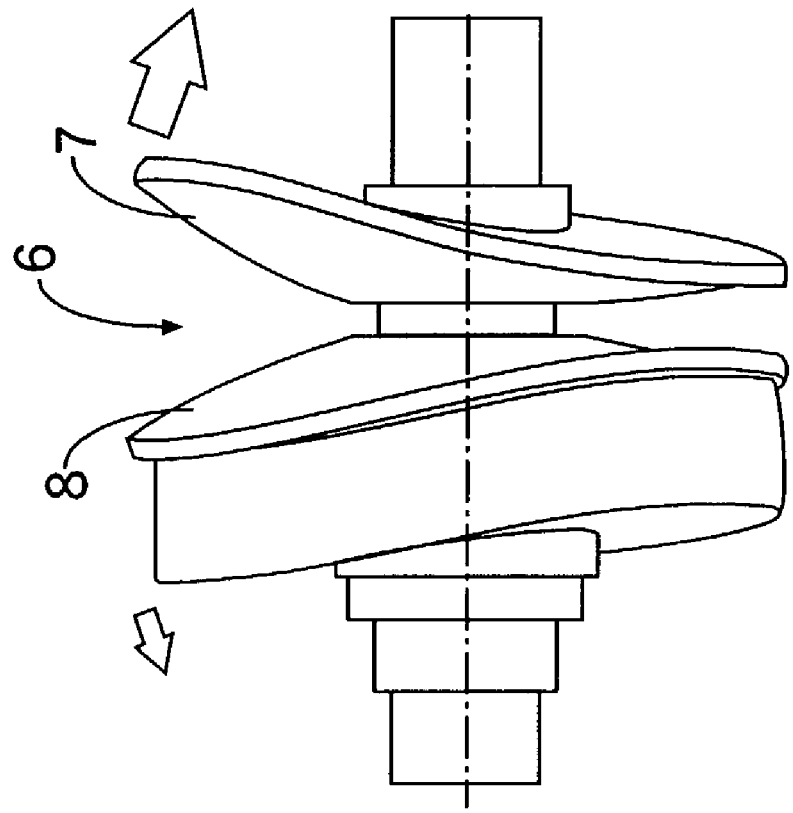

Next, in order to examine the influence of the drive pulley 6 in which the amount of flexing is large, rotational springs representing the flexural stiffness of the drive pulley 6 were added to the simulation model, as shown in FIG. 10B. The flexural stiffness of the fixed pulley half 7 was set at Ks, and the flexural stiffness of the movable pulley half 8 was set at Km. The values for the flexural stiffness Ks and Km were calculated by creating a 3D FEM model of the pulley and adding the load of the metal belt 15 in a static manner. The pulley deforms in both the radial direction and the peripheral direction according to the stiffness thereof. Since the flexural deformation is the largest among the deformations, only the flexural deformation of the pulley was taken into consideration in this calculation.

Figure 11:
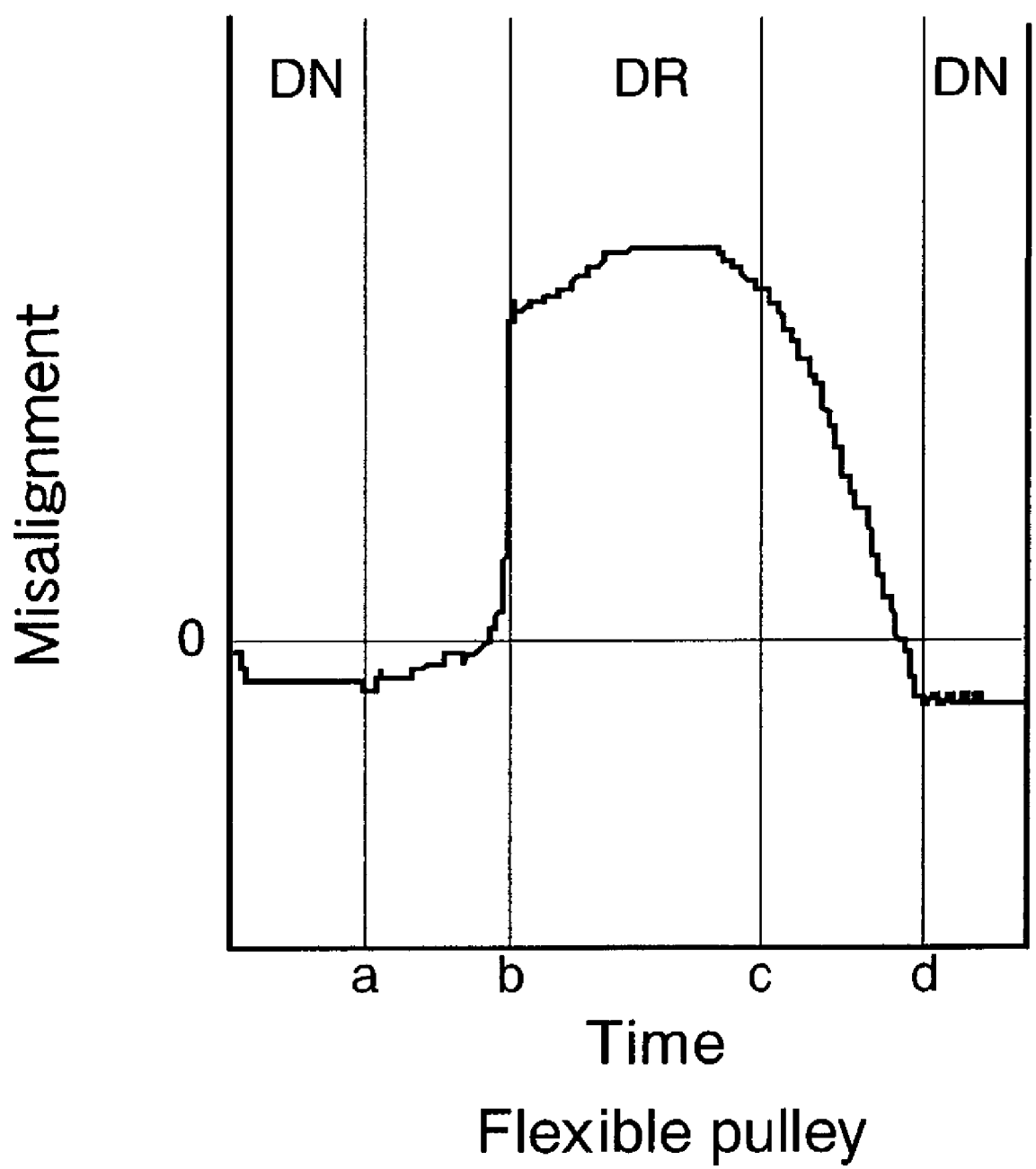
FIG. 11 is a graph illustrating the distribution of misalignment in the peripheral direction of the metal ring assemblies when the flexural stiffness of the pulleys is taken into consideration.

FIG. 11 shows the relationship between the misalignment of the metal elements 32 and the position of the metal belt 15 when the influence of flexing of the pulley is taken into consideration, and a, b, c, and d in the abscissa denote the peripheral positions of the metal belt 15 shown in FIG. 7. In this case, only the stiffness of the drive pulley 6, which has a large amount of flexing, is taken into consideration, and different values are set for the flexural stiffness of the left and right pulley halves 7, 8. As is clear from comparison with FIG. 6 where the drive pulley 6 is assumed to be rigid, the misalignment increases in the section from b to c where the metal belt 15 is wound around the drive pulley 6.

Figure 12:
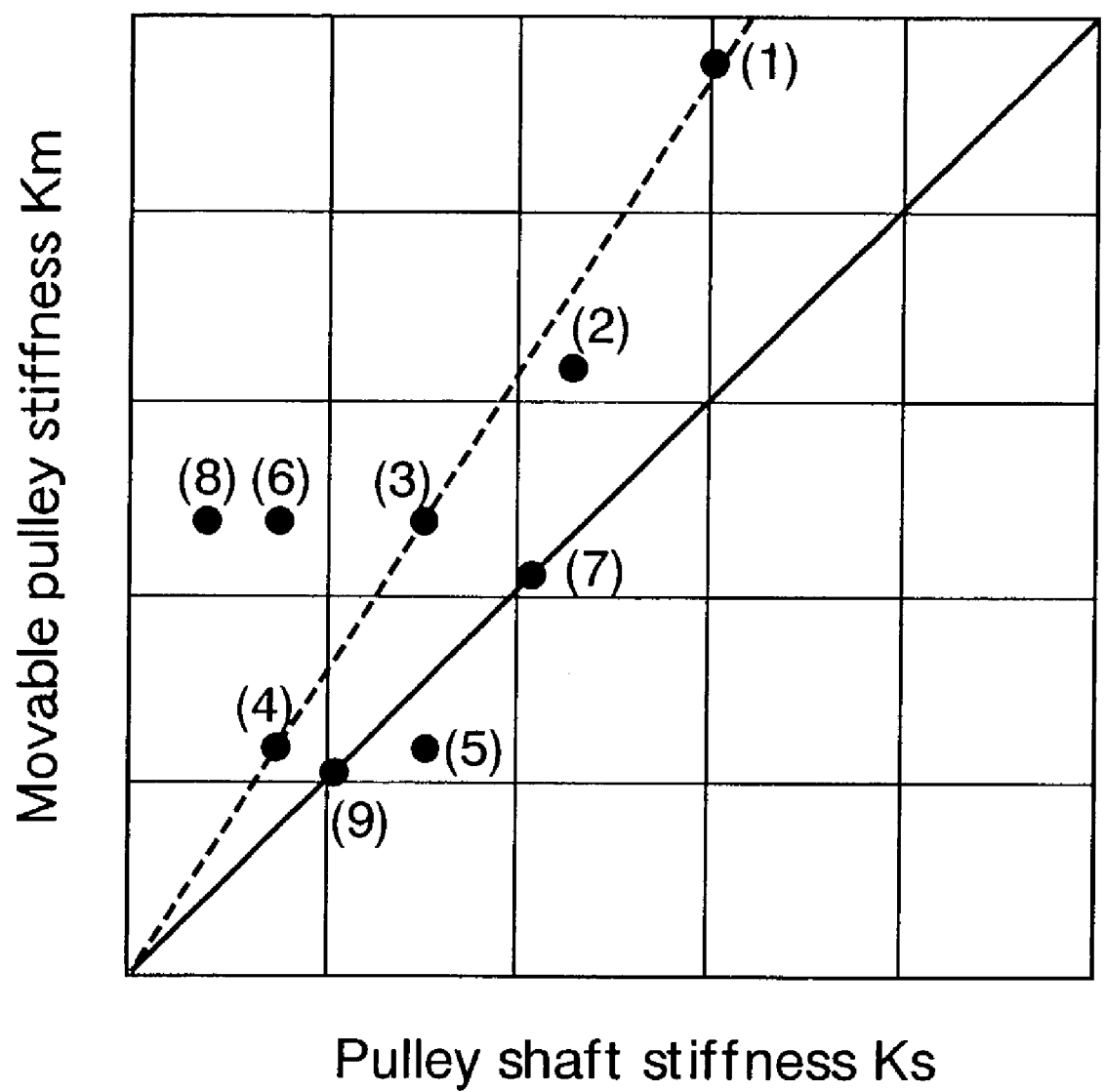
FIG. 12 is a graph illustrating the definitions of cases (1) to (9) in which the fixed pulley half and the movable pulley half have different stiffness values.

Next, how the stress on the metal ring assembly 31 changes with the stiffness of the drive pulley 6 was examined. FIG. 12 shows, for cases (1) to (9), nine combinations of the stiffness of the two pulley halves 7, 8 used in a parameter study. That is, the abscissa denotes the stiffness Ks of the pulley shaft (that is, the fixed pulley half 7) and the ordinate denotes the stiffness Km of the movable pulley half 8.

In FIG. 12, the solid line passing through case (7) and case (9) denotes a relationship where the fixed pulley half 7 and the movable pulley half 8 have a stiffness ratio of one; in cases (1) to (4), (6), and (8) the stiffness of the movable pulley half 8 is thus greater than the stiffness of the fixed pulley half 7, and on the other hand in case (5) the stiffness of the movable pulley half 8 is less than the stiffness of the fixed pulley half 7.

Figure 13:
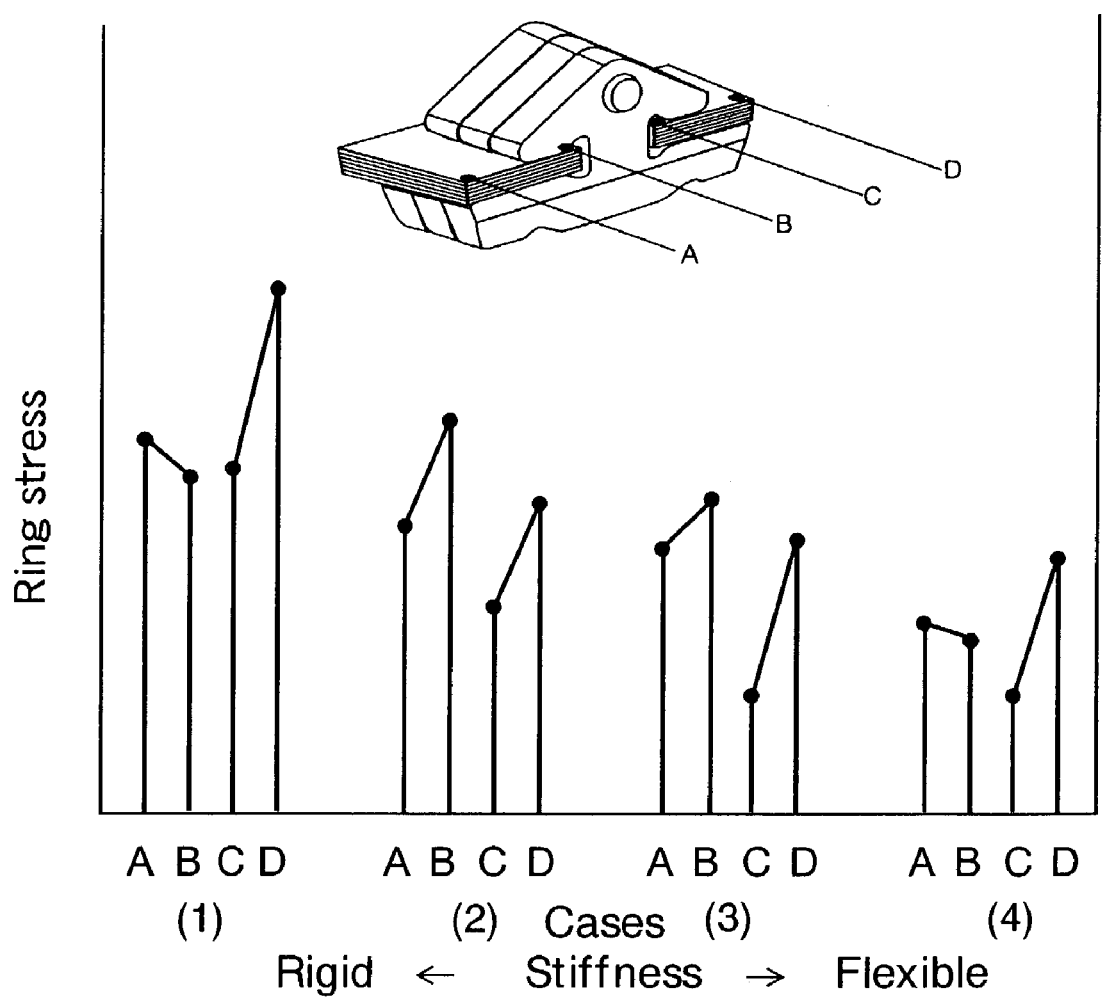
FIG. 13 is a graph illustrating the stress on four edges of the metal ring assemblies in cases (1) to (4)

FIG. 13 shows the stress at four edges A, B, C, and D of the pair of metal ring assemblies 31 for the four cases (1), (2), (3), and (4) where the absolute value of the stiffness is changed while maintaining a substantially constant stiffness ratio of the fixed pulley half 7 and the movable pulley half 8 (see broken line in FIG. 12). Here, the stress value used is the maximum value in the peripheral direction of the metal ring assemblies 31. As is clear from FIG. 13, the greater the absolute value of the stiffness, which increases gradually from case (4) to case (1), the higher the stress.

Figure 14B:
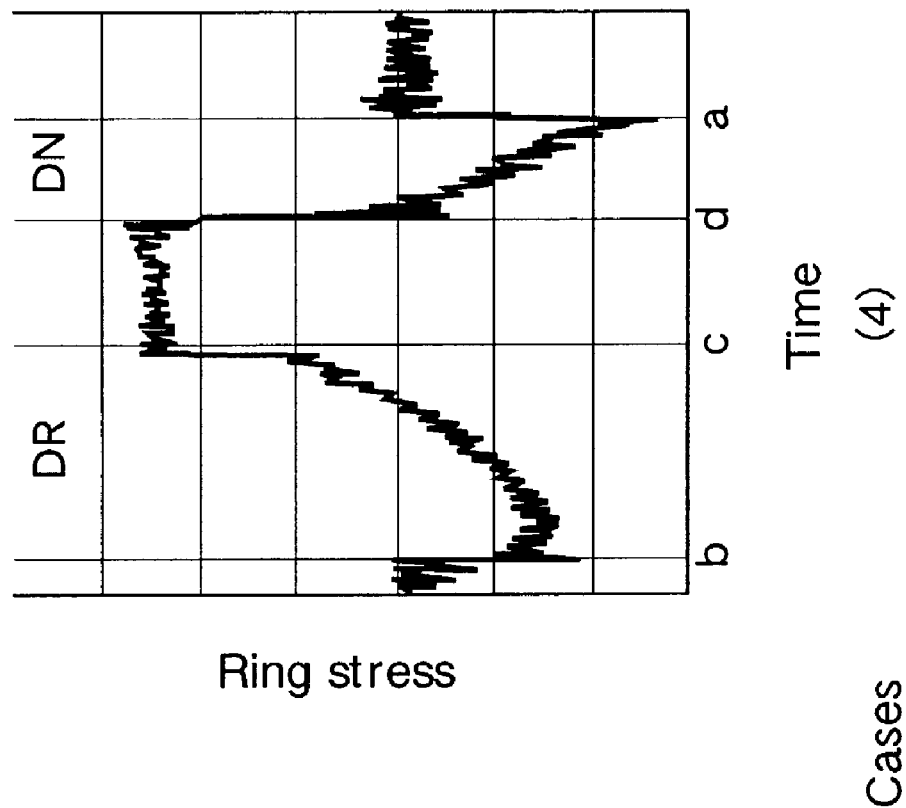
FIGS. 14A and 14B are graphs illustrating the distribution of stress in the peripheral direction of the metal ring assemblies in cases (1) and (4)
Figure 14A:
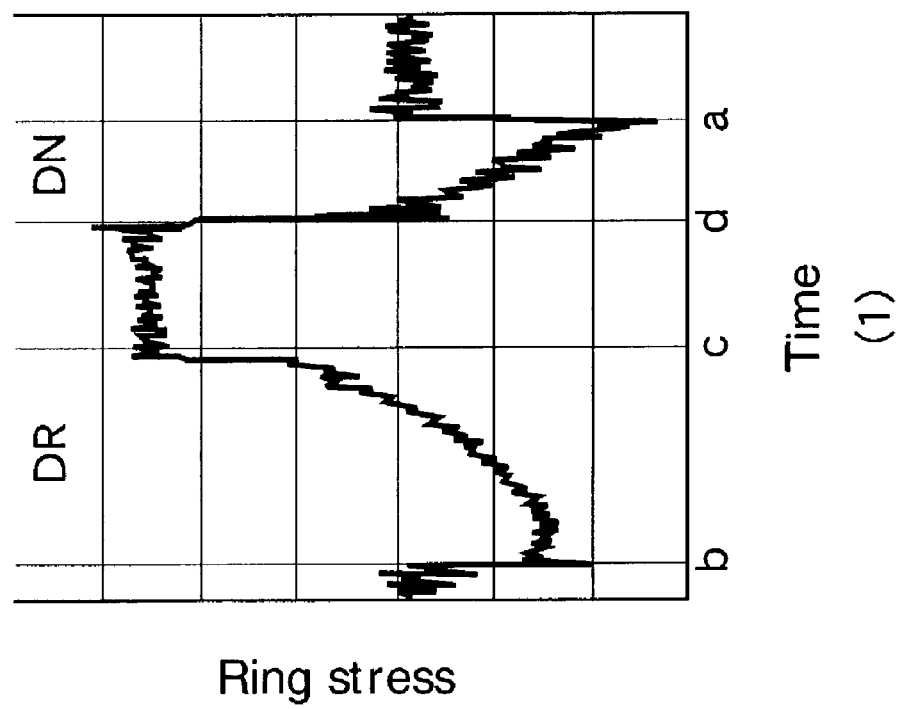

FIG. 14 shows the distribution of stress in the peripheral direction of the metal ring assembly 31 in cases (1) and (4). In case (1) where the stiffness is higher than in case (4), it was found that the stress amplitude at the entrance of the drive pulley 6 increased. It is conceivable that the reason therefor is because in case (1), where the flexural stiffness of the drive pulley 6 is high, the impact load of the V-face of the drive pulley 6 acting on the pulley abutment surfaces 39 of the metal elements 32 increases (see the entrance position b of the drive pulley 6 in FIG. 15(A)), thereby promoting the increase in stress of the metal ring assembly 31.

Figure 16:
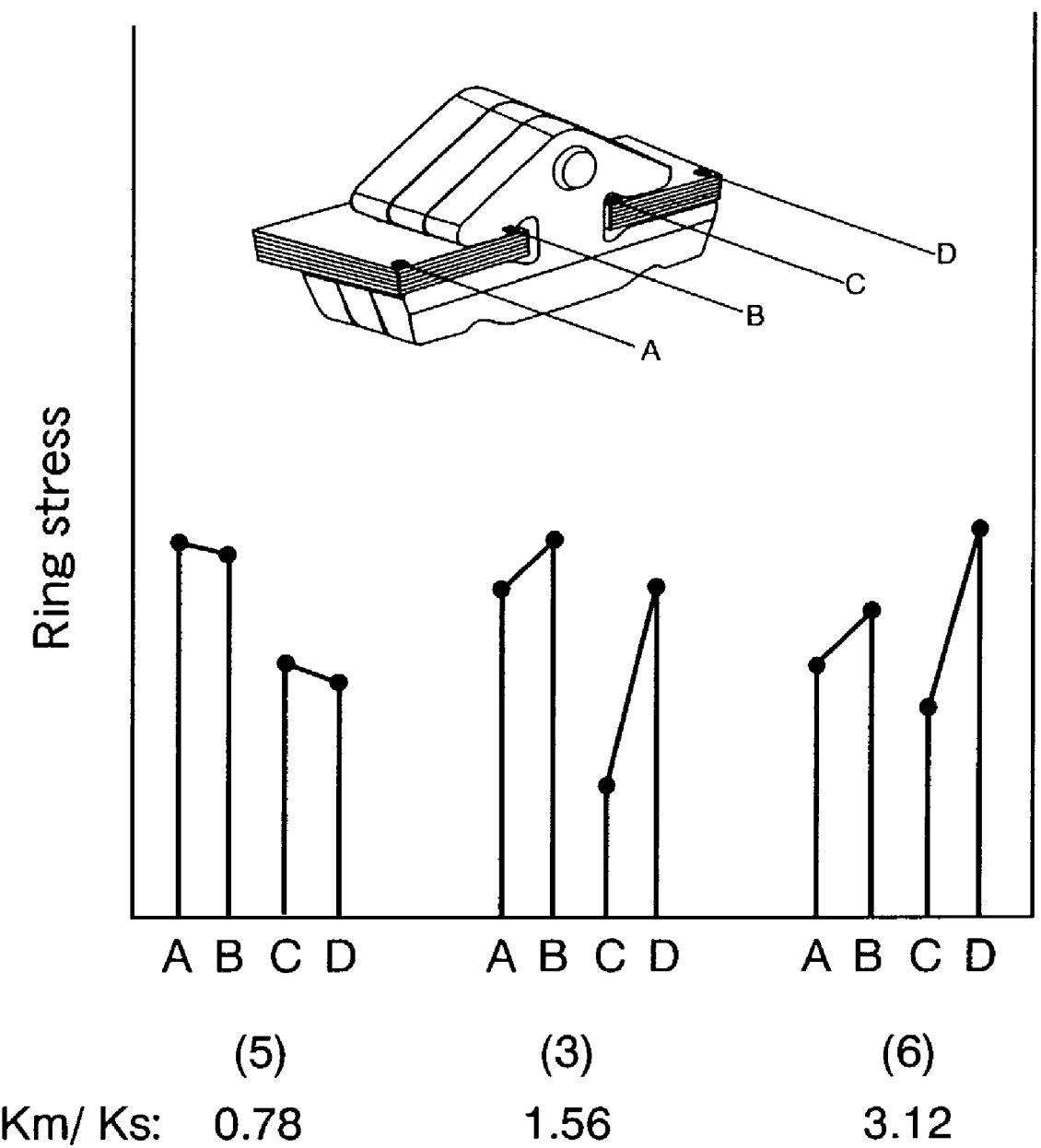
FIG. 16 is a graph illustrating the stress on the four edges of the metal ring assemblies of cases (5), (3), and (6)

FIG. 16 shows the stress on the four edges A, B, C, and D of the metal ring assemblies 31 for the cases (5), (3), and (6) where the stiffness ratio (Km/Ks) of the fixed pulley half 7 and the movable pulley half 8 is changed. It was found that, although there were slight differences in the stress on the four edges A, B, C, and D of the metal ring assemblies 31 for cases (5), (3), and (6), the influence of the stiffness ratio was low. However, the stiffness ratio had a direct effect on the relative alignment between the metal elements 32 and the metal ring assemblies 31.

Figure 17:
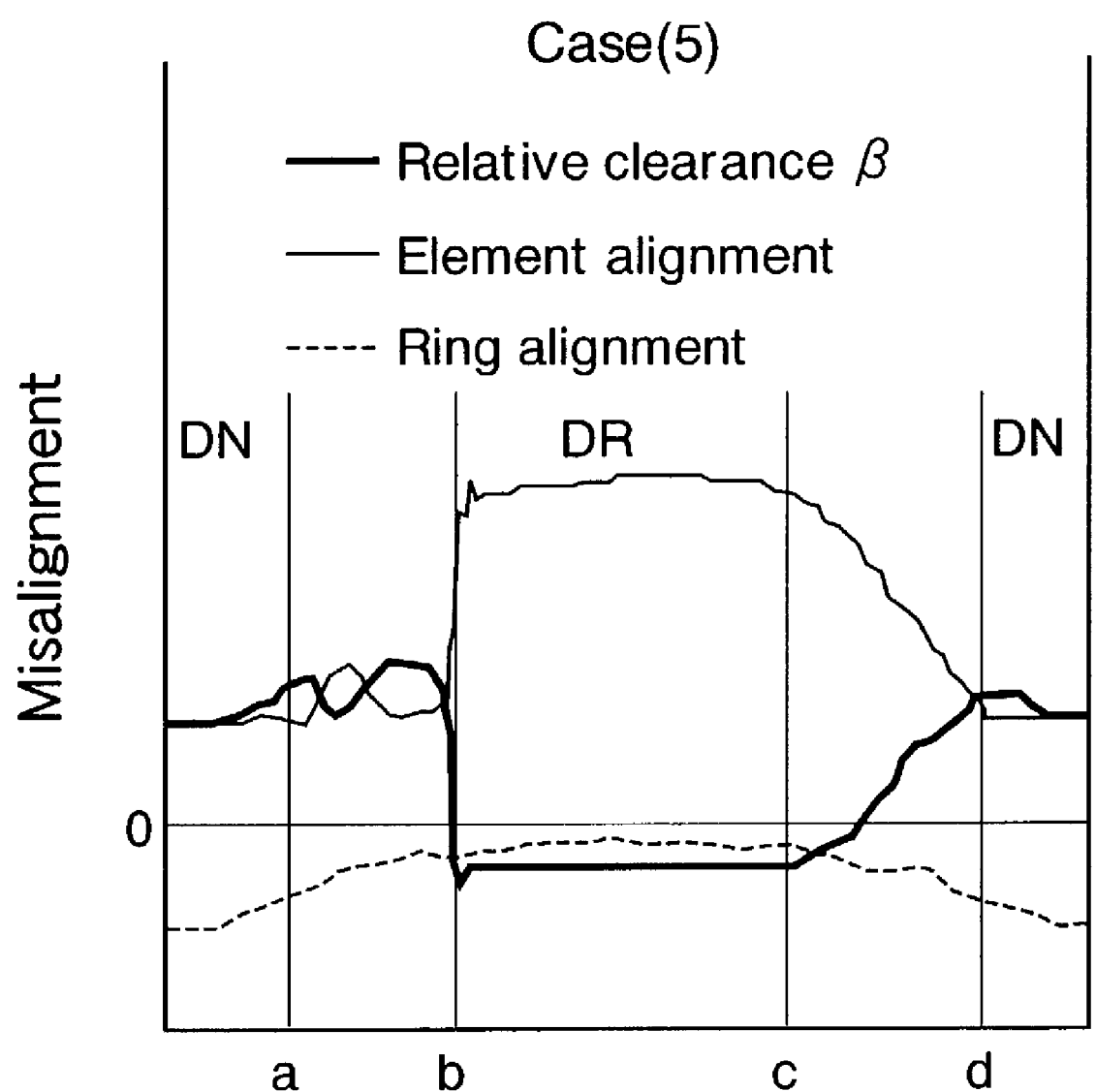
FIG. 17 is a graph illustrating the distribution of clearance and misalignment in the peripheral direction of the metal ring assemblies in case (5)

FIG. 17 shows the clearance β (see FIG. 3) between the metal ring assembly 31 on the movable pulley half 8 side and the neck portion 36 of the metal elements 32, the misalignment of the metal elements 32, and the misalignment of this metal ring assembly 31. In this figure, the clearance β between the metal ring assembly 31 on the movable pulley half 8 side and the neck portion 36 of the metal elements 32 is extremely small in the region from b to c where the metal belt 15 is wound around the drive pulley 6. Therefore, there is a possibility that the inner edge of the metal ring assembly 31 comes into contact with the metal elements 32, thereby degrading the durability.

Figure 18:
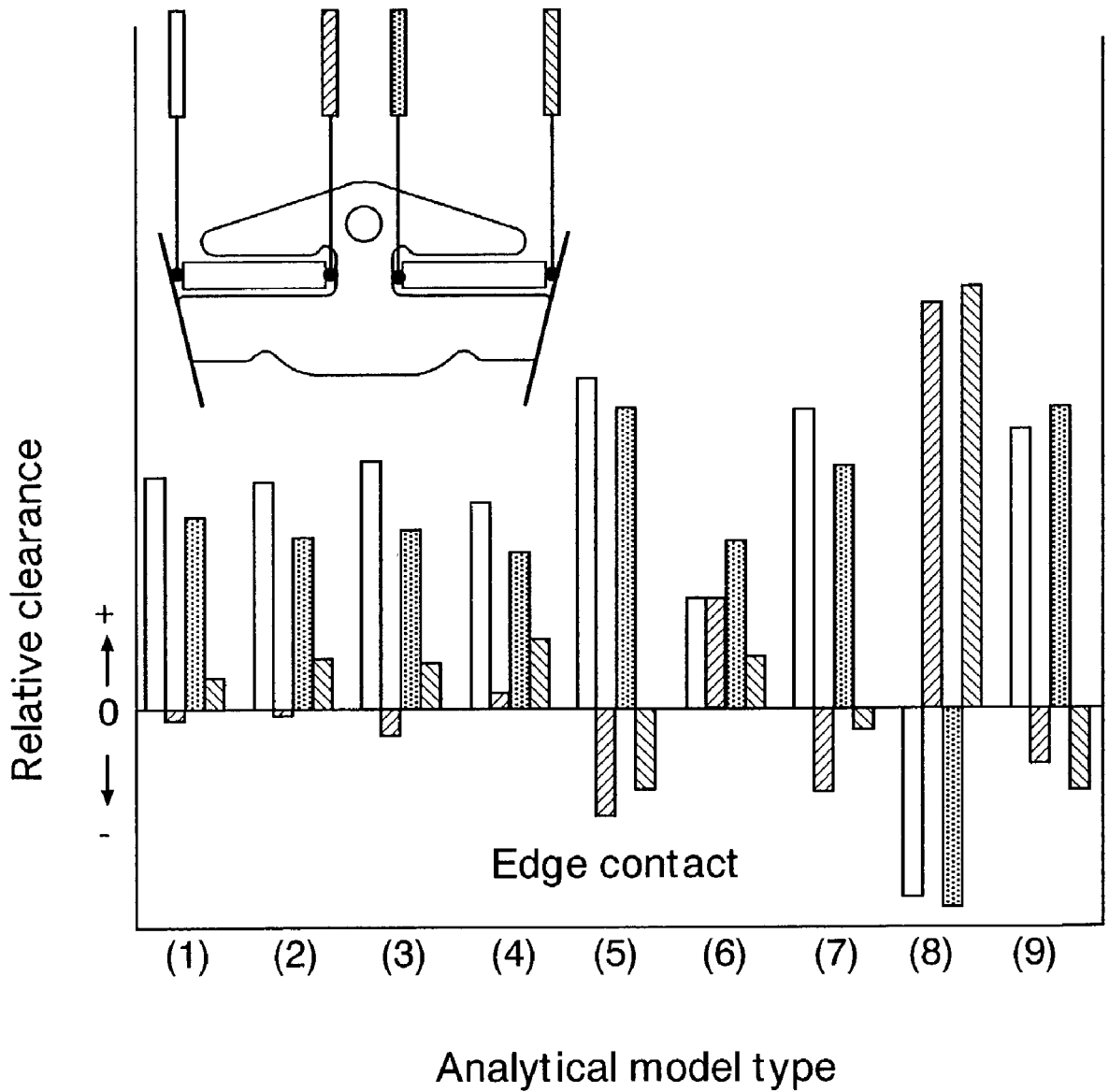
FIG. 18 is a graph illustrating the clearance of the four edges of the metal ring assemblies in cases (1) to (9).

FIG. 18 shows the clearance at the outer edges and the clearance at the inner edges of the left and right metal ring assemblies 31 for all the cases (1) to (9). A negative value for the clearance suggests that the edge of the metal ring assembly 31 is in contact with the metal element 32 or the driven pulley 6. In cases (5), (7), and (9) where the difference in stiffness between the movable pulley half 8 and the fixed pulley half 7 is close to zero or reversed, it was found that the metal ring assembly 31 on the movable pulley half 8 side and the neck portion 36 of the metal elements 32 were strongly in contact with each other and the metal ring assembly 31 on the fixed pulley half 7 side and the fixed pulley half 7 were strongly in contact with each other, thereby affecting the durability of the metal ring assemblies 31.

On the other hand, in cases (1), (2), (3), (4), and (6) where the stiffness of the movable pulley half 8 is set higher than the stiffness of the fixed pulley half 7, the contact of the edges of the metal ring assemblies 31 was greatly alleviated. Among these cases, there was no contact at all in cases (4) and (6). In case (8) where the stiffness of the movable pulley half 8 is set higher than the stiffness of the fixed pulley half 7, the metal ring assembly 31 on the movable pulley half 8 side and the movable pulley half 8 were in contact with each other, and the metal ring assembly 31 on the fixed pulley half 7 side and the neck portions of the metal elements 32 were in contact with each other, but this is an exceptional case where the stiffness of the movable pulley half 8 is set much higher than the stiffness of the fixed pulley half 7. Setting the stiffness ratio appropriately as in cases (1), (2), (3), (4), and (6) can reliably suppress the deterioration in durability due to contact of the edges of the metal ring assembles 31.

It should be noted that while a preferred embodiment of the present invention has been described in detail above, the present invention can be modified in a variety of ways without departing from the spirit and scope of the present invention.

The invention claimed is:

1. A continuously variable transmission, comprising:
    a drive pulley having a fixed pulley half and a movable pulley half;
    a driven pulley having a fixed pulley half and a movable pulley half; and
    a metal belt having:
        a metal ring assembly including a plurality of endless metal rings laminated on one another; and
        a plurality of metal elements supported on the metal ring assembly,
    wherein the metal belt is wound around the drive pulley and the driven pulley,
    wherein the fixed pulley half of the drive pulley and the fixed pulley half of the driven pulley are disposed in diagonal positions relative to each other, and wherein the movable pulley half of the drive pulley and the movable pulley half of the driven pulley are in diagonal positions relative to each other,
    wherein the movable pulley half of the drive pulley has a flexural stiffness higher than a flexural stiffness of the fixed pulley half of the drive pulley,
    wherein each metal element comprises:
        a trapezoidal shaped main body,
        a triangular shaped ear portion, and
        a neck portion, wherein only the neck portion connects the ear portion to the main body,
    wherein a clearance ($\beta$) is defined between an inner edge of the metal ring assembly and the neck portion of the each metal element, and
    wherein a stiffness ratio (Km/Ks) of the movable pulley half with respect to the fixed pulley half is equal to or more than 1.56.

2. The continuously variable transmission according to claim 1, wherein first and second sides of the neck portion define corresponding first and second ring slots into which the metal rings are fitted.

3. The continuously variable transmission according to claim 2, wherein saddle faces are formed on lower edges of the first and second ring slots, the saddle faces supporting inner peripheral surfaces of the metal rings.

4. The continuously variable transmission according to claim 3, wherein the saddle faces have a convex shape to center the metal rings thereon.

5. The continuously variable transmission according to claim 4, wherein the saddle faces prevent edges of the metal rings from contacting the neck portion of each metal element.

6. The continuously variable transmission according to claim 1, wherein each metal element abuts a neighboring metal element.

7. The continuously variable transmission according to claim 1, wherein lateral side faces of the main body include converging abutment surfaces.

8. The continuously variable transmission according to claim 7, wherein the channel of each ring slot extends along a lower edge of the ring slot from the corresponding lobe to the corresponding abutment surface in a direction away from the neck.

9. The continuously variable transmission according to claim 8, wherein a termination point is defined where the lower edge of each ring slot intersects with the corresponding abutment surface.

10. The continuously variable transmission according to claim 9, wherein the metal ring assembly extends from within the lobe of the ring slot to the termination point.

11. The continuously variable transmission according to claim 1, wherein first and second sides of the neck portion define corresponding first and second ring slots into which the metal rings are fitted, the first and second ring slots each having a lobe in open communication with a channel, the lobe for each ring slot being defined immediately adjacent to the corresponding one of the first and second sides, and wherein an inner edge of the metal ring assembly is positioned within the lobe.

12. The continuously variable transmission according to claim 1, wherein a misalignment in the metal elements is larger in a region of the metal belt wound around the drive pulley then in a region of the metal belt wound around the driven pulley.

* * * * *